(12) United States Patent
Yanagida

(10) Patent No.: US 7,896,372 B2
(45) Date of Patent: Mar. 1, 2011

(54) SUSPENSION DEVICE

(75) Inventor: Takuya Yanagida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/449,477

(22) PCT Filed: Jan. 18, 2008

(86) PCT No.: PCT/JP2008/050630

§ 371 (c)(1),
(2), (4) Date: Aug. 10, 2009

(87) PCT Pub. No.: WO2008/099636

PCT Pub. Date: Aug. 21, 2008

(65) Prior Publication Data

US 2010/0102527 A1      Apr. 29, 2010

(30) Foreign Application Priority Data

Feb. 14, 2007    (JP) ................. 2007-034007

(51) Int. Cl.
*B60G 3/18* (2006.01)
(52) U.S. Cl. ................................ 280/124.135
(58) Field of Classification Search .......... 280/124.128, 280/124.134, 124.135, 124.136, 124.141, 280/124.143, 124.145
See application file for complete search history.

(56) References Cited

U.S. PATENT DOCUMENTS

| | | | | |
|---|---|---|---|---|
| 4,671,531 A | * | 6/1987 | Sautter et al. | 280/124.109 |
| 4,790,560 A | * | 12/1988 | Asanuma et al. | 280/124.128 |
| 4,815,755 A | * | 3/1989 | Takata et al. | 280/124.128 |
| 4,840,396 A | * | 6/1989 | Kubo | 280/124.143 |
| 4,930,805 A | * | 6/1990 | Takata et al. | 280/124.128 |
| 5,000,477 A | * | 3/1991 | Minakawa et al. | 280/124.136 |
| 5,340,146 A | * | 8/1994 | Kato | 280/124.143 |
| 5,499,839 A | * | 3/1996 | Wahl et al. | 280/124.145 |
| 6,357,772 B1 | * | 3/2002 | Pelz et al. | 280/124.143 |
| 6,945,547 B2 | * | 9/2005 | Ackley et al. | 280/124.143 |
| 2005/0140110 A1 | * | 6/2005 | Lee et al. | 280/124.109 |

FOREIGN PATENT DOCUMENTS

JP         61-181706         8/1986

(Continued)

*Primary Examiner*—Paul N Dickson
*Assistant Examiner*—Robert A Coker
(74) *Attorney, Agent, or Firm*—Carrier Blackman & Associates, P.C.; Joseph P. Carrier; William D. Blackman

(57) ABSTRACT

Since a vehicular width direction inside end and vehicular width direction outside end of a trailing arm 12 are pivotably supported on a vehicle body and a knuckle 11, respectively, and a vehicular width direction inside end of a lower arm 14 is pivotably supported on the vehicle body and a vehicular width direction outside end thereof is connected to the trailing arm 12 via a pair of rubber bush joints 22, 23, even though the lower arm 14 is made up of a rigid body which is difficult to deflect in a vehicular longitudinal direction, the rubber bush joints 22, 23 can be deformed when load FX in the vehicular longitudinal direction is inputted into a wheel W so as to enhance the longitudinal compliance of the wheel W to thereby improve the riding comfort.

7 Claims, 4 Drawing Sheets

FOREIGN PATENT DOCUMENTS

| | | |
|---|---|---|
| JP | 2-30707 | 2/1990 |
| JP | 5-278421 | 10/1993 |
| JP | 8-58328 | 3/1996 |
| JP | 9-290610 | 11/1997 |
| JP | 2002-46442 | 2/2002 |

* cited by examiner

SUSPENSION DEVICE

TECHNICAL FIELD

The present invention relates to a suspension device for suspending a wheel on a vehicle body so as to be movable in a vertical direction by a first suspension arm which is pivotably supported on the vehicle body at a vehicular width direction inside end and is pivotably supported on a knuckle at a vehicular width direction outside end thereof and a second suspension arm which is pivotably supported on the vehicle body at a vehicular width direction inside end and is connected to the first suspension arm at a vehicular width direction outside end thereof.

BACKGROUND ART

A suspension device is known in Patent Document No. 1 below in which an upper portion of a wheel supporting member (a knuckle) is pivotably supported on a vehicle body via an upper arm, while a lower portion of the wheel supporting member is pivotably supported on the vehicle body via a lower arm and the lower arm is made up of a front-side arm portion which is pivotably supported on the wheel supporting member at a vehicular width direction outside end thereof and a rear-side arm portion which is rigidly connected to the front-side arm portion at a vehicular width direction outside end thereof.

This suspension device is configured such that when a load in a vehicular longitudinal direction is inputted into a wheel, a rubber bush joint at a front end of the front-side arm of the lower arm is elastically deformed and the rear-side arm portion which extends in a vehicular width direction is deflected in the vehicular longitudinal direction to thereby permit a longitudinal motion of the wheel supporting member, whereby longitudinal compliance for the wheel is secured so as to enhance the riding comfort.

[Patent Document No. 1] Japanese Patent Unexamined Publication No. JP-A-9-290610

DISCLOSURE OF THE INVENTION

Problem to be Solved by the Invention

In the suspension device described in Patent Document No. 1 above, however, the rear-side arm portion itself of the lower arm is caused to be deflected so as to secure the longitudinal compliance of the wheel. Due to this, not only are the material and shape thereof largely restricted, whereby the degree of freedom in design is largely restricted when attempting to secure durability against the metal fatigue of the rear-side arm portion, but also the design itself of the rear-side arm portion needs to be changed to change the setting of the longitudinal compliance, there having been thereby caused a problem that this constitutes a factor to increase the costs thereof.

The invention has been made in view of these situations, and an object thereof is to provide a suspension device including a first suspension arm for connecting a knuckle and a vehicle body together and a second suspension arm for connecting the vehicle body and the first suspension arm together, wherein longitudinal compliance for a wheel is secured while making up the second suspension arm of a rigid body.

Means to Solve the Problem

With a view to attaining the object, according to a first invention, there is proposed a suspension device for suspending a wheel on a vehicle body so as to be movable in a vertical direction, including:

a first suspension arm which is pivotably supported on the vehicle body at a vehicular width direction inside end and is pivotably supported on a knuckle at a vehicular width direction outside end thereof; and a second suspension arm which is pivotably supported on the vehicle body at a vehicular width direction inside end and is connected to the first suspension arm at a vehicular width direction outside end thereof, wherein the vehicular width direction outside end of the second suspension arm is connected to the first suspension arm via a plurality of elastic members.

In addition, according to a second invention, there is proposed a suspension device according to the first aspect of the invention, wherein at least one of the elastic members is a cylindrical bush of which axis is parallel to a vehicular longitudinal reaction.

Note that a trailing arm 12 of an embodiment corresponds to the first suspension arm of the invention, a lower arm 14 of the embodiment corresponds to the second suspension arm of the invention, and rubber bush joints 22, 23 of the embodiment correspond to the elastic members of the invention.

According to a first aspect of the invention, the vehicular width direction inside end and vehicular width direction outside end of the first suspension arm are pivotably supported on the vehicle body and the knuckle, respectively, and the vehicular width direction inside end of the second suspension arm is pivotably supported on the vehicle body and the vehicular width direction outside end of the second suspension arm is connected to the first suspension arm via the plurality of elastic members. Because of this, when load in the vehicular longitudinal direction is inputted into the wheel, even though the second suspension arm is made up of a rigid body which is difficult to deflect in the vehicular longitudinal direction, longitudinal compliance of the wheel can be enhanced by the deformation of the plurality of elastic members so as to improve the riding comfort, and moreover, vibration such as road noise can be cut off by the elastic members.

In addition, since the second suspension arm can be made up of a rigid body which is difficult to deflect, the degree of freedom in designing material and shape therefor can be increased, which can contribute to reduction in cost and weight.

Furthermore, should the first and second suspension arms be connected together by a single elastic member, the first and second suspension arms would be angularly displaced relative to each other and the posture of the knuckle could not be held. However, by connecting them together with the plurality of elastic members, the relative angular displacement of the first and second suspension arms can be prevented.

In addition, the longitudinal compliance of the wheel can easily be adjusted only by adjusting the hardness of the plurality of elastic members.

According to a second aspect of the invention, at least one of the plurality of elastic members which connect the vehicular width direction outside end of the second suspension arm to the first suspension arm is made up of the cylindrical bush of which axis is parallel to the vehicular longitudinal direction. Because of this, even though the second suspension arm is made up of a rigid body which is difficult to deflect, by deforming the cylindrical bush by the longitudinal load which is inputted into the wheel, the longitudinal compliance of the wheel can be enhanced further so as to improve the riding comfort.

In addition, when vehicular width load is inputted into the wheel, since the cylindrical bush which receives the radial load is not deformed easily, the rigidity of the toe angle of the wheel can be enhanced so as to secure the steering stability.

Further, the suspension device of the invention may be configured such that the vehicular width direction inside end is pivotably supported on the vehicle body, and the vehicular width direction outside end has an upper arm pivotably supported on an upper portion of the knuckle.

Furthermore, the suspension device of the invention is adapted to have a damper and a spring disposed between the first suspension arm and the vehicle body, and the damper and the spring can be pivotably supported on the first suspension arm and the vehicle body at different attachment points.

Further, it is adaptable that the second suspension arm has plurality of penetrating holes extending in a vehicular longitudinal direction and the plurality of elastic elements are inserted into the plurality of penetrating holes, respectively.

Furthermore, it is adaptable that the connecting member includes:

a pair of vertical wall portions which face each other in the vehicular longitudinal direction while holding the second suspension arm therebetween; and a plate-shaped upper wall portion which is provided at upper ends of the vertical wall portion so as to be substantially perpendicular to the vertical wall portions and is attached to a lower surface of the first suspension arm, and a suspension spring is attached to an upper surface of the first suspension arm in a position which corresponds to a position where the upper wall portion of the connecting member is attached.

Figure 1:
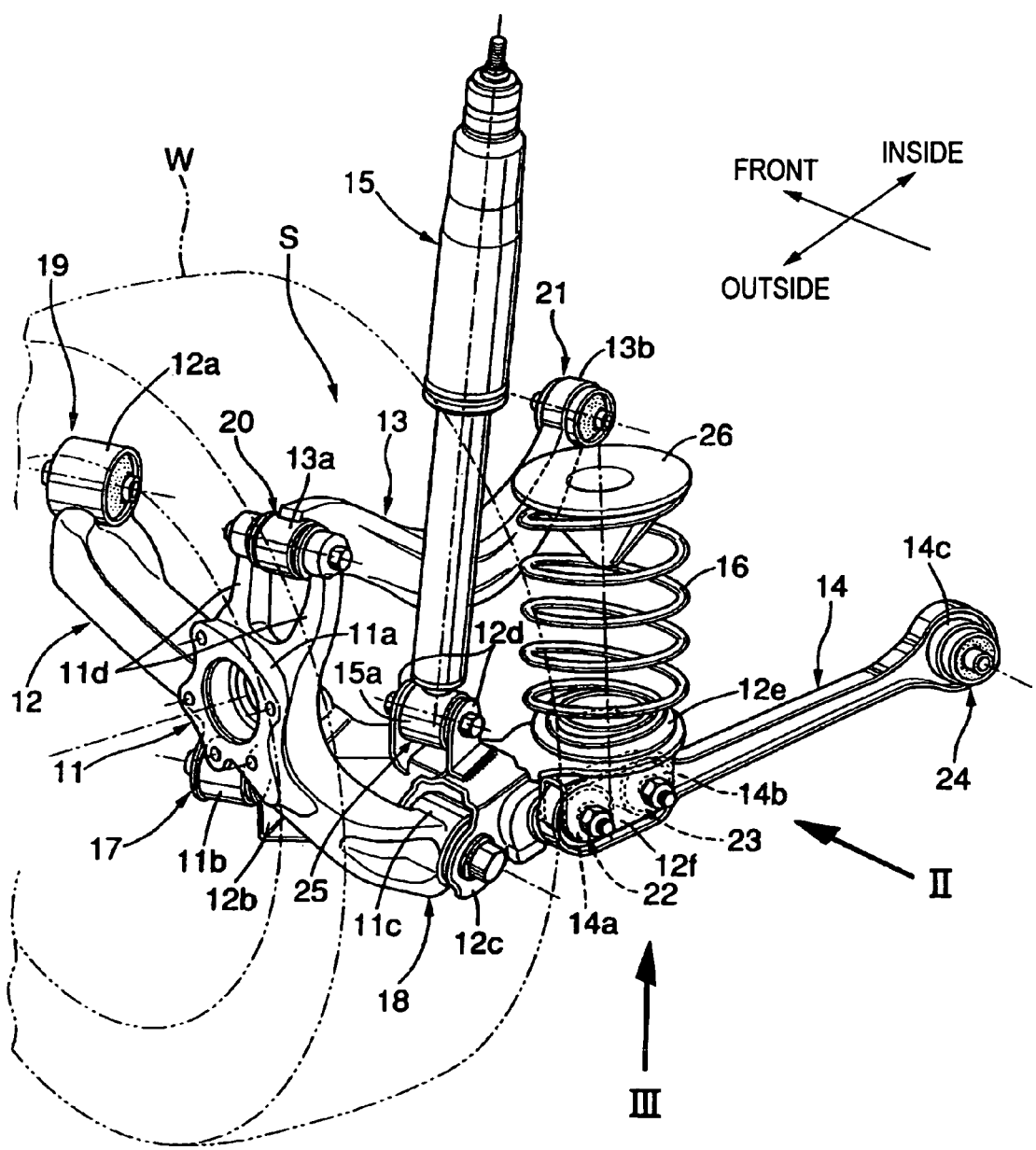
[FIG. 1] A perspective view of a suspension device for a left rear wheel of a motor vehicle as viewed from the top rear thereof.

DESCRIPTION OF REFERENCE NUMERALS 11 knuckle
12 trailing arm (a first suspension arm)
14 lower arm (a second suspension arm)
22 rubber bush joint (an elastic member)
23 rubber bush joint (an elastic member)
L axis
W wheel

BEST MODE FOR CARRYING OUT THE INVENTION

Hereinafter, an embodiment of the invention will be described based on the accompanying drawings.

Figure 2:
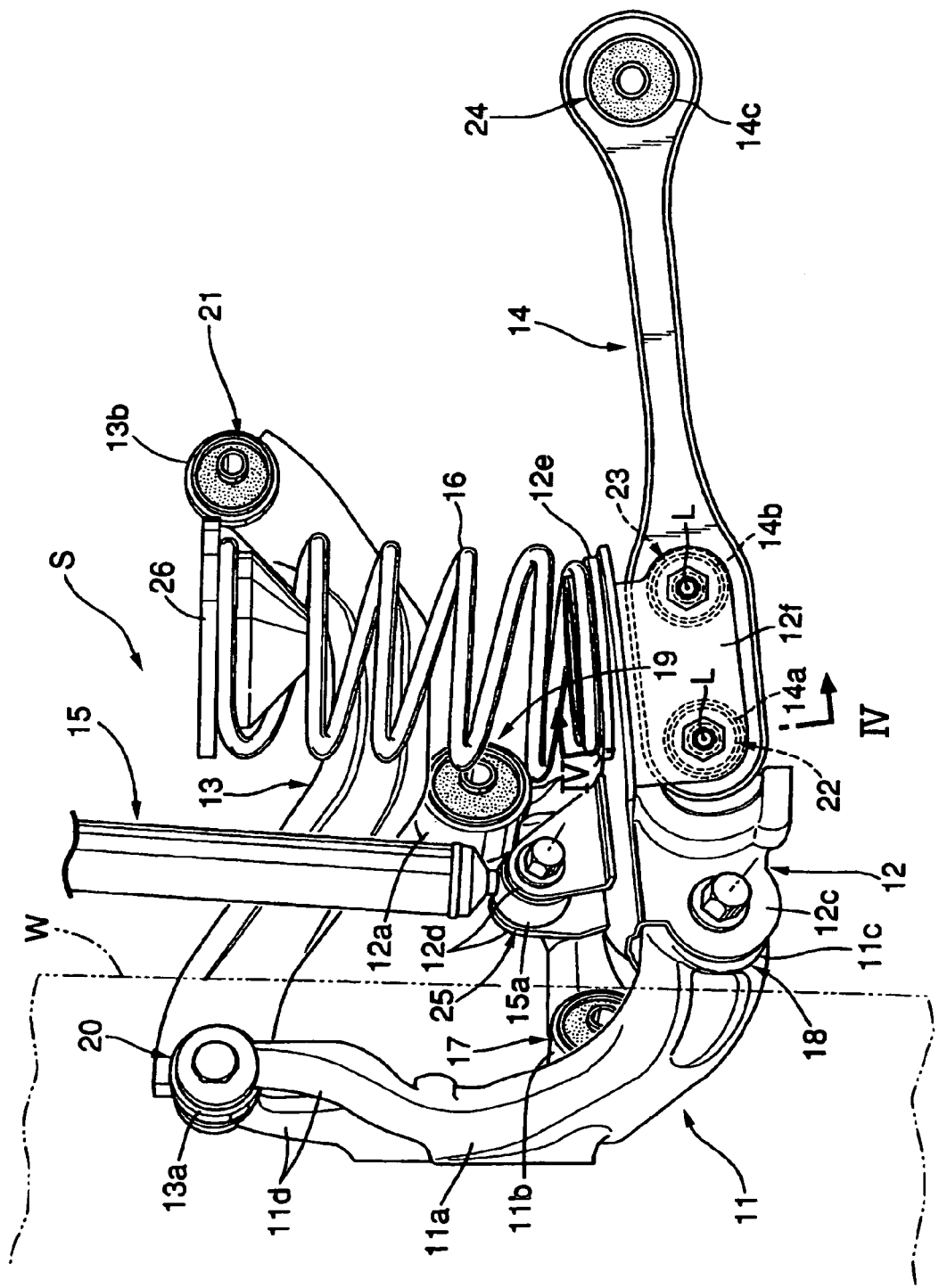
[FIG. 2] A view as viewed in a direction indicated by an arrow II in FIG. 1 (a rear view).
Figure 3:
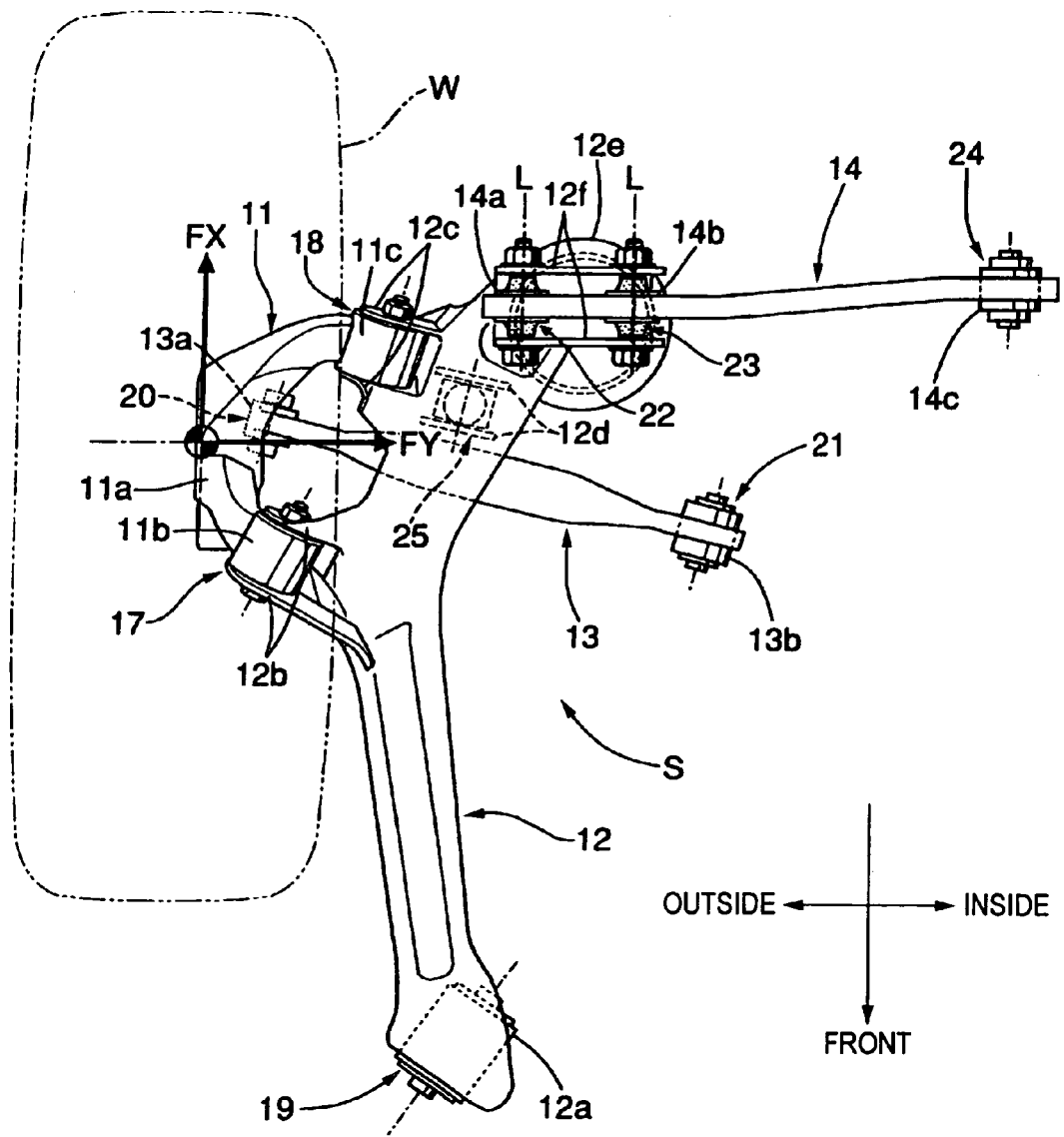
[FIG. 3] A view as viewed in a direction indicated by an arrow III in FIG. 1 (a bottom view).
Figure 4:
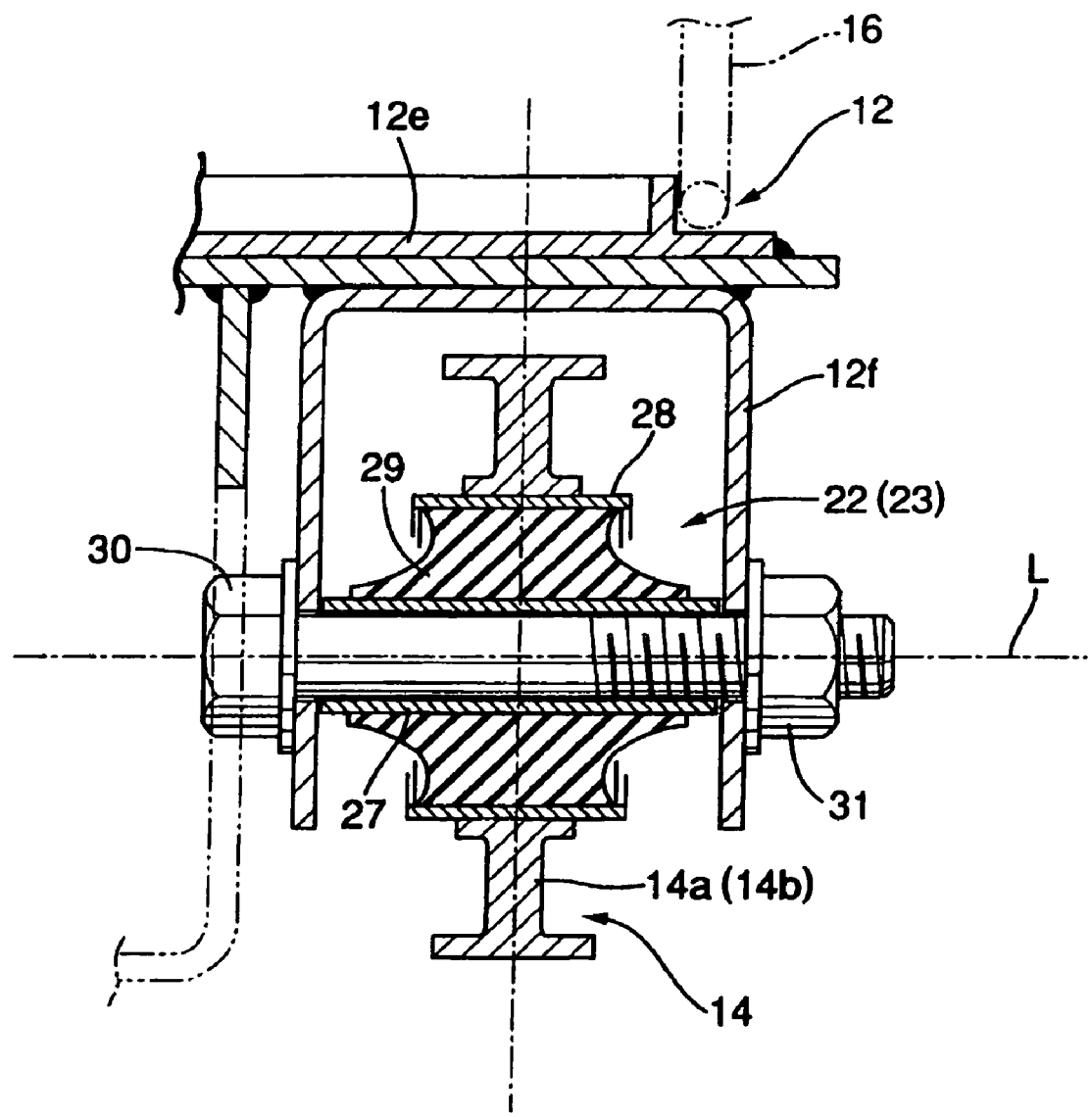
[FIG. 4] An enlarged sectional view taken along the line IV-IV in FIG. 2.

FIGS. 1 to 4 are such as to show an embodiment of the invention. FIG. 1 is a perspective view of a suspension device for a left rear wheel of a motor vehicle as viewed from the top rear thereof. FIG. 2 is a view as viewed in a direction indicated by an arrow II in FIG. 1 (a rear view). FIG. 3 is a view as viewed in a direction indicated by an arrow III in FIG. 1 (a bottom view). FIG. 4 is an enlarged sectional view taken along the line IV-IV in FIG. 2.

As is shown in FIGS. 1 to 3, a suspension device S of a left rear wheel of a motor vehicle includes:

a knuckle 11 which supports a wheel W rotatably;

a trailing arm 12 which extends from the knuckle 11 towards the front of a vehicle body and the inside in a vehicular width direction;

an upper arm 13 which extends from the knuckle 11 towards the inside of the vehicular width direction;

a lower arm 14 which extends from the trailing arm 12 towards the inside of the vehicular width direction;

a damper 15 which extends upwards from the trailing arm 12; and a suspension spring 16 which extends upwards from the trailing arm 12.

The knuckle 11 includes:

a main body portion 11a which supports rotatably an axle (not shown);

a cylindrical first trailing arm connecting portion 11b which is provided at a distal end which extends forwards and downwards from the main body portion 11a;

a cylindrical second trailing arm connecting portion 11c which is provided at a distal end which extends rearwards and downwards from the main body portion 11a; and an upper arm connecting portion 11d which extends upwards from the main body portion 11a in a bifurcated fashion.

The trailing arm 12 is a member which is bent into the shape of turned flattened V shape (Japanese Hiragana phonetically translated "he") as viewed from the top and includes:

a cylindrical vehicle body connecting portion 12a which is provided at a front end;

a bifurcated first knuckle connecting portion 12b which is provided in a longitudinally intermediate portion;

a bifurcated second knuckle connecting portion 12c which is provided directly at the rear of the first knuckle connecting portion 12b;

a bifurcated damper connecting portion 12d which is provided on an upper surface in the vicinity of the second knuckle connecting portion 12c;

a circular dish-shaped spring seat 12e which is provided on the upper surface at a rear end; and a channel-shaped lower arm connecting portion 12f which is provided on a lower surface of the spring seat 12e.

The upper arm 13, which extends in the vehicular width direction in general, is an arc-shaped member which is curved downwards in an intermediate portion and includes a cylindrical knuckle connecting portion 13a which is provided at a vehicular width direction outside end and a cylindrical vehicle body connecting portion 13b which is provided at a vehicular width direction inside end.

The lower arm 14, which extends in the vehicular width direction in general, is a rectilinear member and includes a pair of cylindrical trailing arm connecting portions 14a, 14b which is provided at a vehicular width direction outside end and a cylindrical vehicle body connecting portion 14c which is provided at a vehicular inside end.

Then, the first knuckle connecting portion 12b and the second knuckle connecting portion 12c of the trailing arm 12 are connected to the first trailing arm connecting portion 11b and the second trailing arm connecting portion 11c of the knuckle 11 via rubber bush joints 17, 18, respectively. Furthermore, the vehicle body connecting portion 12a of the trailing arm 12 is connected to a vehicle body, not shown, via a rubber bush joint 19.

The knuckle connecting portion 13a of the upper arm 13 is connected to the upper arm connecting portion 11d of the knuckle 11 via a rubber bush joint 20, and the vehicle body connecting portion 13b is connected to the vehicle body, not shown, via a rubber bush joint 21.

The pair of trailing arm connecting portions 14a, 14b is connected to the lower arm connecting portion 12f of the trailing arm 12 via a pair of rubber bush joints 22, 23, respectively. Furthermore, the vehicle body connecting portion 14c of the lower arm 14 is connected to the vehicle body, not shown, via a rubber bush joint 24.

A cylindrical trailing arm coupling portion 15a provided at a lower end of the damper 15 is coupled to a damper coupling portion 12d of the trailing arm 12 via a rubber bush joint 25. Further, an upper end of the suspension spring 16 of which lower end is supported by a spring sheet 12e of the trailing arm 12 is supported by a not shown spring sheet 26.

As is obvious from FIG. 4, the rubber bush joint 22 connects the trailing arm connecting portion 14a of the lower arm 14 to the lower arm connecting portion 12f of the trailing arm 12. This rubber bush joint 22 is made by stoving a cylindrical rubber bush 29 so as to be caused to adhere to an outer circumferential surface of an inner cylinder 27 and an inner circumferential surface of an outer cylinder 28. A bolt 30, which passes through the channel-shaped lower arm connecting portion 12f and the inner cylinder 27, is fastened with a nut 31, and the outer cylinder 28 of the rubber bush joint 22 is press fitted in the trailing arm connecting portion 14a of the lower arm 14, whereby the vehicular width direction outside end of the lower arm 14 is connected to the trailing arm 12.

The attaching construction of the rubber bush joint 23 which lies adjacent to the rubber bush joint 22 is the same as the construction shown in FIG. 4.

Axes L of the two rubber bush joints 22, 23, that is, a direction in which the bolt 30 extends is aligned with the vehicular longitudinal direction. In FIG. 4, rubber bushes 29, 29 of the rubber bush joints 22, 23 exhibit a weak resisting force against a shearing force in the direction of the axes L and exhibit a strong resisting force against compressive and tensile forces in a radial direction which intersects the axes L at right angles. Consequently, the lower arm 14 and the trailing arm 12 are made relatively easy to move relative to each other in the direction of the axes L (the spring constant being small) are made difficult to move relative to each other in the radial direction which intersects the axes L at right angles (the spring constant being large).

Next, the function of the embodiment of the invention will be described which is configured as has been described above.

The trailing arm 12 and the lower arm 14 are connected together by the pair of rubber bush joints 22, 23 which are disposed parallel to each other in the vehicular width direction. Moreover, the rubber bush joints 22, 23 have the large spring constant against the load in the radial direction which intersects the axes L at right angles. Because of this, when load FX in the vehicular longitudinal direction is inputted as a result of the wheel W riding on irregularities on the road surface or lateral load FY is inputted as a result of the vehicle turning, the trailing arm 12 and the lower arm 14 are hardly angularly displaced relative to each other. Consequently, the trailing arm 12 and the lower arm 14 move vertically as a whole about the rubber bush joint 19 at the vehicular width direction inside end of the trailing arm 12 and the rubber bush joint 24 at the vehicular width direction inside end of the lower arm 14 as fulcrums or function as an A-type arm. Consequently, the rigidity of the toe angle and camber angle of the wheel W can be secured.

Should the trailing arm 12 and the lower arm 14 be connected to each other by a single rubber bush joint, when the lateral load FY is inputted into the wheel W, the trailing arm 12 and the lower arm 14 would easily be displaced angularly at the single rubber bush joint. Therefore, the angle of the knuckle 11 is changed, and the rigidity of the toe angle and camber angle of the wheel W cannot be secured.

Incidentally, in the event that the knuckle 11 is allowed to move in parallel in the vehicular longitudinal direction when the load FX in the vehicular longitudinal direction is inputted into the wheel W, or in the event that the longitudinal compliance of the wheel W is high, the load FX inputted into the wheel W in the vehicular longitudinal direction can be absorbed so as to increase the riding comfort.

Therefore, the spring constant of the rubber bush joint 19 at the front end of the trailing arm 12 is generally set to be low, and in the case of the suspension device described in Patent Document No. 1 referred to above, the rear part of the lower arm is designed to deflect in the vehicular longitudinal direction so as to enhance the longitudinal compliance.

In contrast thereto, in this embodiment, the lower arm 14 is made up as the substantially rigid body which neither deflects nor deforms, and when the load FX in the vehicular longitudinal direction is inputted into the wheel W to cause the trailing arm 12 to withdraw, the pair of rubber bush joints 22, 23 provided between the trailing arm 12 and the lower arm 14 are elastically deformed so as to secure the longitudinal compliance. As this occurs, since the shearing force in the direction of the axes L is applied to the pair of rubber bush joints 22, 23, the spring constant thereof becomes so small that the rubber bush joints 22, 23 are elastically deformed and can permit the withdrawal of the trailing arm 12.

Thus, according to the embodiment, even though the lower arm is made up of the rigid body which is difficult to deflect in the vehicular longitudinal direction, the pair of rubber bush joints 22, 23 can elastically be deformed when the load FX in the vehicular longitudinal direction is inputted into the wheel W, whereby the longitudinal compliance of the wheel W can be enhanced so as to improve the riding comfort. As this occurs, since vibration such as road noise can be cut off by the rubber bush joints 22, 23, the riding comfort is improved further. Moreover, since the lower arm 14 can be made up of the rigid body which is difficult to deflect, the degree of freedom in designing the material and shape thereof can be increased so as to contribute to the reduction in cost and weight of the suspension device. Furthermore, the longitudinal compliance can easily be adjusted without changing the design of the lower arm 14 only by adjusting the hardness of the pair of rubber bush joints 22, 23.

While the embodiment of the invention has been described heretofore, the invention can be changed variously in design without departing from the spirit and scope thereof.

For example, in the embodiment, while the trailing arm 12 and the lower arm 14 are connected together by the pair of rubber bush joints 22, 23, the trailing arm 12 and the lower arm 14 may be connected together by three or more rubber bush joints.

In addition, in the embodiment, while the axes L of the pair of rubber bush joints 22, 23 are both directed in the vehicular longitudinal direction, the axis L of at least one rubber bush joint may only have to be directed in the vehicular longitudinal direction.

INDUSTRIAL APPLICABILITY

According to the invention, even though the second suspension arm is made up of the rigid body which is difficult to deflect in the vehicular longitudinal direction, the plurality of elastic members are elastically deformed when the load in the vehicular longitudinal direction is inputted into the wheel so as to enhance the longitudinal compliance of the wheel to thereby improve the riding comfort, and moreover, vibration such as road noise can be cut off by the elastic members.

In addition, since the second suspension arm can be made up of the rigid body which is difficult to deflect, the degree of freedom in designing the material and shape thereof can be increased to contribute to the reduction in cost and weight of the suspension device.

Furthermore, should the first and second suspension arms be connected together by a single elastic member, the first and second suspension arms would be angularly displaced relative to each other, and the posture of the knuckle could not be held. However, by connecting the first and second suspension arms together by the plurality of elastic members, the relative angular displacement of the first and second suspension arms can be prevented.

In addition, the longitudinal compliance of the wheel can easily be adjusted only by adjusting the hardness of the plurality of elastic members.

The invention claimed is:

1. A suspension device, which suspends a wheel on a vehicle body so as to be movable in a vertical direction, comprising:
   a first suspension arm comprising:
      a vehicular width direction outside end pivotally supported on a knuckle; and
      another end portion pivotally supported on the vehicle body in a position lying further forwards than the vehicular width direction outside end in a vehicular longitudinal direction;
   a second suspension arm extending in a vehicular width direction and comprising:
      one end connected to the first suspension arm in a position lying further rearwards than the other end portion of the first suspension arm in the vehicular longitudinal direction; and
      another end pivotally supported on the vehicle body; and
   a connecting member comprising a plurality of elastic elements attached directly to the one end of the second suspension arm and disposed side by side in the vehicular width direction,
   wherein the second suspension arm is connected to the first suspension arm via the connecting member.

2. The suspension device as set forth in claim 1, wherein at least one of the elastic members is a cylindrical bush of which an axis is parallel to the vehicular longitudinal direction.

3. The suspension device as set forth in claim 1, wherein said another end portion of the first suspension arm is a vehicular width direction inside end thereof; wherein said vehicular width direction inside end is pivotably supported on the vehicle body, and
   the vehicular width direction outside end comprises an upper arm pivotably supported on an upper portion of the knuckle.

4. The suspension device as set forth in claim 1, further comprising a damper and a spring disposed between the first suspension arm and the vehicle body,
   wherein the damper and the spring are pivotably supported on the first suspension arm and the vehicle body at different attachment points.

5. The suspension device as set forth in claim 1, wherein the second suspension arm has plurality of penetrating holes extending in the vehicular longitudinal direction and
   the plurality of elastic elements are inserted into the plurality of penetrating holes, respectively.

6. The suspension device as set forth in claim 5, wherein the connecting member comprises:
   a pair of vertical wall portions which face each other in the vehicular longitudinal direction while holding the second suspension arm therebetween; and
   a plate-shaped upper wall portion which is provided at upper ends of the vertical wall portion so as to be substantially perpendicular to the vertical wall portions and is attached to a lower surface of the first suspension arm, and
   a suspension spring is attached to an upper surface of the first suspension arm in a position which corresponds to a position where the upper wall portion of the connecting member is attached.

7. The suspension device as set forth in claim 1, wherein the connecting member comprises:
   a pair of vertical wall portions which face each other in the vehicular longitudinal direction while holding the second suspension arm therebetween; and
   a plate-shaped upper wall portion which is provided at upper ends of the vertical wall portion so as to be substantially perpendicular to the vertical wall portions and is attached to a lower surface of the first suspension arm, and
   a suspension spring is attached to an upper surface of the first suspension arm in a position which corresponds to a position where the upper wall portion of the connecting member is attached.

* * * * *